United States Patent
Varache

(10) Patent No.: US 11,237,110 B2
(45) Date of Patent: Feb. 1, 2022

(54) METHOD FOR PHOTOLUMINESCENCE MEASUREMENT OF A SAMPLE

(71) Applicant: COMMISSARIAT A L'ENERGIE ATOMIQUE ET AUX ENERGIES ALTERNATIVES, Paris (FR)

(72) Inventor: Renaud Varache, La Sauvetat (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 72 days.

(21) Appl. No.: 16/764,985

(22) PCT Filed: Nov. 20, 2018

(86) PCT No.: PCT/FR2018/052910
§ 371 (c)(1),
(2) Date: May 18, 2020

(87) PCT Pub. No.: WO2019/102125
PCT Pub. Date: May 31, 2019

(65) Prior Publication Data
US 2020/0400577 A1    Dec. 24, 2020

(30) Foreign Application Priority Data

Nov. 21, 2017 (FR) ...................................... 1761011

(51) Int. Cl.
*G01N 21/64* (2006.01)
*H02S 50/15* (2014.01)
*G01N 21/95* (2006.01)

(52) U.S. Cl.
CPC ..... *G01N 21/6489* (2013.01); *G01N 21/6456* (2013.01); *G01N 21/9501* (2013.01); *H02S 50/15* (2014.12); *G01N 2021/646* (2013.01)

(58) Field of Classification Search
CPC .......... G01N 21/8803; G01N 21/8806; G01N 21/9501; G01N 21/9505; G01N 21/4785;
(Continued)

(56) References Cited

U.S. PATENT DOCUMENTS 6,081,127 A * 6/2000 Wagner .............. G01N 21/6489
324/754.23
7,072,036 B2 * 7/2006 Jones ................... G01N 21/278
356/244
(Continued)

OTHER PUBLICATIONS

International Search Report dated Feb. 13, 2019 in PCT/FR2018/052910 filed on Nov. 20, 2018, 2 pages.
(Continued)

*Primary Examiner* — Gordon J Stock, Jr.
(74) *Attorney, Agent, or Firm* — Oblon, McClelland, Maier & Neustadt, L.L.P.

(57) ABSTRACT

A method for photoluminescence measurement of a sample that includes a front face and a rear face linked by a contour, the sample resting, via the rear face of same, on a receiving face of an active base. The sample also includes a first region partially delimited by the contour and that emits a photoluminescence signal of an intensity, referred to as the first intensity, that is lower at any point to the average intensity of the photoluminescence signal of the sample, referred to as the reference intensity, the active base emitting a photoluminescence signal of an intensity, referred to as the secondary intensity, that is at least equal to the reference intensity. The active base includes an edge that is set apart from the contour by an overlap distance and that delimits, with said contour, a peripheral section of the active base.

20 Claims, 7 Drawing Sheets

(58) Field of Classification Search
CPC .... G01N 21/63; G01N 21/64; G01N 21/6456; G01N 21/6458; G01N 21/6489; G01N 2021/933; G01N 2021/936; G01N 2021/8461; G01N 2021/646; G01N 2033/0095; G01J 1/10; G01J 1/12; G01J 1/14; G01J 1/18; H02S 50/10; H02S 50/15; G06T 2207/30148
See application file for complete search history.

(56) References Cited

U.S. PATENT DOCUMENTS

| | | | | |
|---|---|---|---|---|
| 7,742,164 | B1* | 6/2010 | Phillips | G01N 21/4785 356/243.2 |
| 8,604,447 | B2* | 12/2013 | Young | G01N 21/9501 250/459.1 |
| 8,759,793 | B2* | 6/2014 | Giesecke | G01N 21/6408 250/459.1 |
| 9,685,906 | B2* | 6/2017 | Lagowski | G01N 21/9501 |
| 9,885,662 | B2* | 2/2018 | Trupke | G01N 21/6489 |
| 10,199,985 | B2* | 2/2019 | Zimmermann | G06T 11/60 |
| 2010/0102237 | A1* | 4/2010 | Nomura | G01N 21/64 250/363.01 |
| 2011/0025839 | A1 | 2/2011 | Trupke et al. | |
| 2015/0323457 | A1 | 11/2015 | Trupke et al. | |
| 2016/0341665 | A1 | 11/2016 | Nagatomi et al. | |

OTHER PUBLICATIONS

French Preliminary Search Report dated Jul. 2, 2018 in French Application 1761011 filed on Nov. 21, 2017, 1 page.

Würfel, P. et al., "Generalized Planck's radiation law for luminescence via indirect transitions," Applied Physics A Materials Science & Processing, vol. 60, No. 1, Jan. 1995, pp. 67-70.

Trupke, T. et al., "Photoluminescence imaging of silicon wafers," Applied Physics Letters, vol. 89, No. 4, Jul. 2006, pp. 044107-1-0441 07-3.

* cited by examiner

METHOD FOR PHOTOLUMINESCENCE MEASUREMENT OF A SAMPLE

TECHNICAL FIELD

The present invention relates to a photoluminescence measurement method. In particular, the present invention relates to a method for photoluminescence measurement of a sample, in particular a photovoltaic cell, enabling the edges of the sample tested to be unambiguously detected.

PRIOR ART

The photoluminescence measurements are choice techniques to probe electronic and/or optical properties of materials, and in particular semiconductor materials.

In practice, photoluminescence measurements implement exciting a material by a laser radiation so as to promote transition of electrons of said material from their ground energy level (also called "equilibrium state") to upper energy levels.

Thus promoted electrons return to their equilibrium state according to radiative or non-radiative recombination paths depending on the quality of the material tested. In this respect, those skilled in the art will find in document [1], cited at the end of the description, a study about radiative and non-radiative recombination modes occurring during a photoluminescence measurement.

In particular, the non-radiative recombinations, generally associated with the presence of defects or to Auger type phenomena, occur at the expense of radiative recombinations.

The radiative recombination rate, the level or intensity of which measured over time represents the photoluminescence signal, enables the quality of the material tested to be characterised. In particular, photoluminescence measurements enable defects likely to be present in the material tested to be detected and/or located.

According to a particular spatially resolved photoluminescence technique developed by Trupke et al., and described in document [2] cited at the end of the description, it is also possible to perform a photoluminescence mapping of the sample tested and especially to locate defects of said sample.

In this respect, FIG. 1 represents a photoluminescence mapping, in grey levels, of a silicon sample bearing on a base plate and comprising a surface passivated with amorphous silicon.

Lighter zones have a stronger radiative recombination rate than dark zones. Reversely, dark zones have a stronger non-radiative recombination rate than light zones. Light zones are thus characteristic zones of a low defect density and dark zones are indicative of a significant defect density.

Among dark zones, the peripheral section or sample edge particularly attracts attention.

Indeed, the processes for manufacturing such samples, especially photovoltaic cells, involve particularly aggressive steps which can each contribute to degrading edges of said samples which, over time, concentrate a significant defect density.

This significant defects concentration results in a very low photoluminescence level and thus an impossibility of distinguishing the sample edge of the base plate on which the latter bears. In other words, the photoluminescence intensity contrast between the sample edge and the base plate is insufficient to locate said edge (FIG. 2).

Consequently, it is difficult, or even impossible, to quantify relative contributions of the different steps of the process for manufacturing the sample to the edge degradation.

Besides, the non-detection of sample edges, especially of photovoltaic cells, limits analysis of the electronically or optically active surface of said sample.

One purpose of the present invention is therefore to provide a photoluminescence measurement method for which the edge of the sample measured can be identified.

DISCLOSURE OF THE INVENTION

The purpose of the present invention is solved by a method for photoluminescence measurement of a sample which comprises two faces, connected by a contour, called a front face and a rear face respectively, the sample bearing on an accommodating face of a base plate, called an active base plate, at its rear face, the sample comprises at least one first region partly delimited by the contour and which emits a photoluminescence signal with an intensity, called a first intensity, at any point lower than the mean intensity of the photoluminescence signal of the sample called a reference intensity, the active base plate emitting a photoluminescence signal with an intensity, called a secondary intensity, at least equal to the reference intensity, the active base plate further comprises an edge B at a distance, according to a projection distance, from the contour C, and delimiting a peripheral section of the active base plate with said contour.

According to one embodiment, the projection distance, at least at the at least one first region, is adjusted such that the variation in the intensity of the photoluminescence signal between the peripheral section and the first region, reveals a singularity locating the contour of the sample at the first region.

According to one embodiment, the singularity is a minimum of the photoluminescence signal intensity.

According to one embodiment, the first region comprises a defect density higher than the mean defect density of the sample.

According to one embodiment, a corona type charge is created on a face, called a second face, of the active base plate opposite to the accommodating face, the corona type charge being intended to adjust the secondary intensity level.

According to one embodiment, the corona type charge is created by an anode and a cathode disposed facing the accommodating face and the second face respectively.

According to one embodiment, the anode comprises a grid interposed between the sample and the active base plate.

According to one embodiment, the active base plate comprises a first passivation layer covering its accommodating face, the first passivation layer being intended to heal defects likely to be present on the accommodating face.

According to one embodiment, the first passivation layer comprises a layer made of a dielectric material or of hydrogenated amorphous silicon, advantageously the dielectric material comprises at least one of the following elements chosen among: silicon dioxide, silicon nitride, alumina.

According to one embodiment, the active base plate comprises a semiconductor material, advantageously the semiconductor material comprises silicon.

According to one embodiment, the sample also comprises at least one second region, partly delimited by the contour and which emits a photoluminescence signal with an intensity, called a second intensity, equal to the reference intensity on average, the measurement method implementing masking means for masking the photoluminescence signal emitted by a region of the peripheral section adjoining the second region.

According to one embodiment, the masking means comprise an intermediate base plate interposed between the sample and the active base plate, the intermediate base plate comprising a masking region covering a region of the peripheral section adjoining the second region.

According to one embodiment, the at least one first region extends over the entire circumference of the sample.

According to one embodiment, the sample is a photovoltaic cell.

According to one embodiment, carrying out the process comprises exciting the sample and the peripheral section of the active base plate by a laser.

According to one embodiment, the laser sweeps the front face and the accommodating face at the peripheral section.

According to one embodiment, the laser has a size adapted to excite the sample and the active base plate simultaneously.

According to one embodiment, the photoluminescence signal emitted by the sample and by the active base plate is collected by a detector.

The invention also relates to a photoluminescence measurement device comprising:
- a base plate, called an active base plate, comprising an accommodating face for a sample, and a second face opposite to the accommodating face,
- a laser excitation source,
- a detector intended to collect a photoluminescence signal emitted by a sample and the support under the action of the laser,
- the active base plate is likely to emit a photoluminescence signal under the effect of an excitation by the laser excitation source, the device further comprising corona means for creating a corona type charge on the second face.

According to one embodiment, the active base plate comprises a substrate made of a semiconductor material, advantageously the semiconductor material comprises silicon.

According to one embodiment, the active base plate comprises a first passivation layer covering its accommodating face, the first passivation layer being intended to heal defects likely to be present on the accommodating face.

According to one embodiment, the corona means comprise an anode and a cathode, the anode comprising a grid disposed facing the accommodating face, and a cathode facing the second face.

BRIEF DESCRIPTION OF THE DRAWINGS

Further characteristics and advantages will appear in the description that follows of a photoluminescence measurement method according to the invention, given by way of non-limiting examples, with reference to the appended drawings in which.

DETAILED DISCLOSURE OF PARTICULAR EMBODIMENTS

The present invention implements a method for photoluminescence measurement of a sample bearing on an active base plate. In particular, the active base plate, according to the present invention, is likely to emit a photoluminescence signal with an intensity at least equal to the mean intensity of the photoluminescence signal emitted by the sample. The active base plate also has a surface area higher than that of the sample such that when the latter bears on said active base plate, a peripheral section projects from the sample and emits a detectable photoluminescence signal and enabling, by contrast difference, the contour of the sample to be detected in the vicinity of low emissive regions of said sample and partly delimited by said contour.

Figure 1:
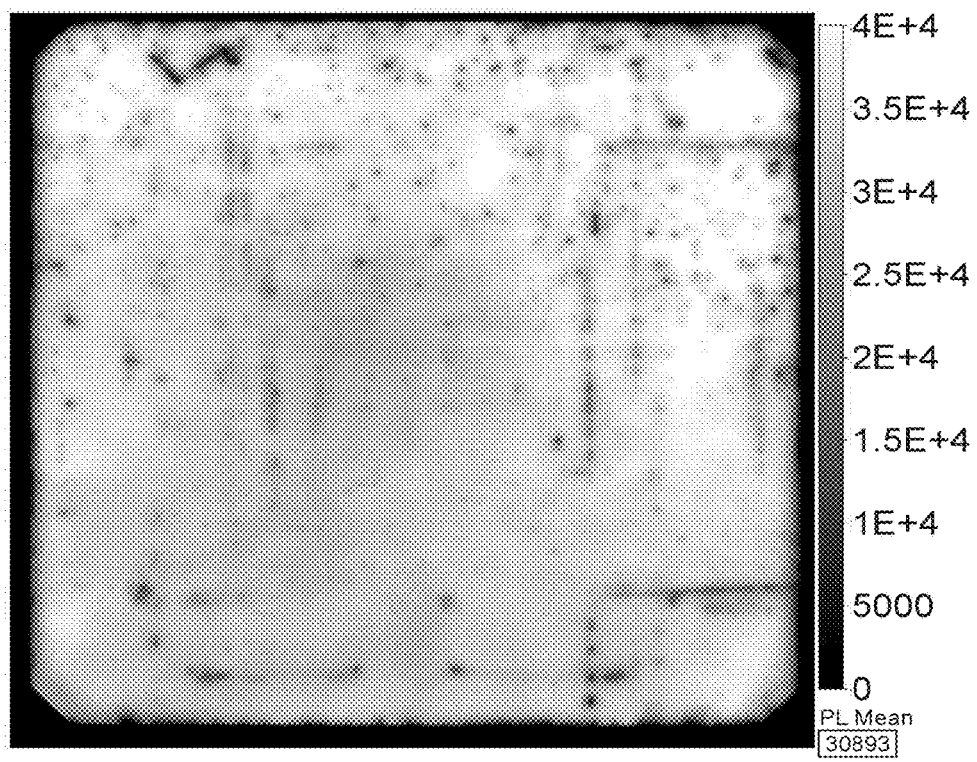
FIG. 1 is a mapping of a silicon sample photoluminescence bearing on a base plate measured according to a known method of prior art, the photoluminescence intensity is given according to a grey level scale attached to the figure.
Figure 2:
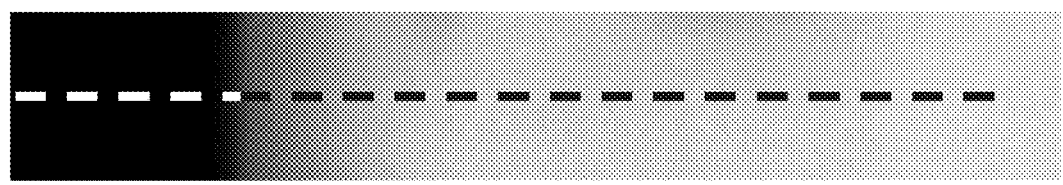
FIG. 2 is a graphic representation of a photoluminescence intensity measurement profile (along the vertical axis in arbitrary unit) as a function of a position along a segment (along the vertical axis in arbitrary unit) passing through the edge of the sample, the segment being also in broken lines on a mapping section extracted from FIG. 1 and attached to said graphic representation.
Figure 2:
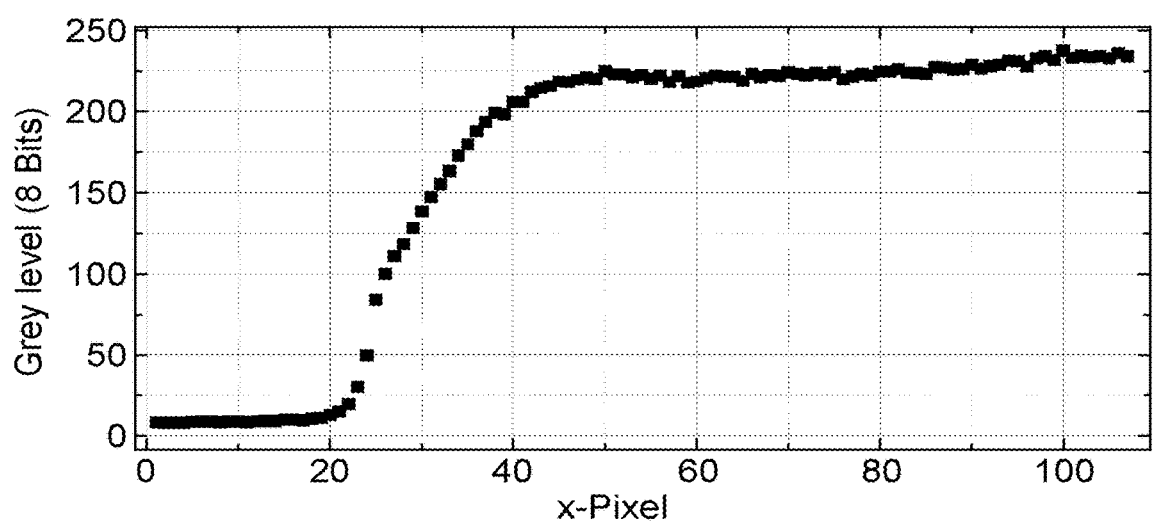
Figure 3:
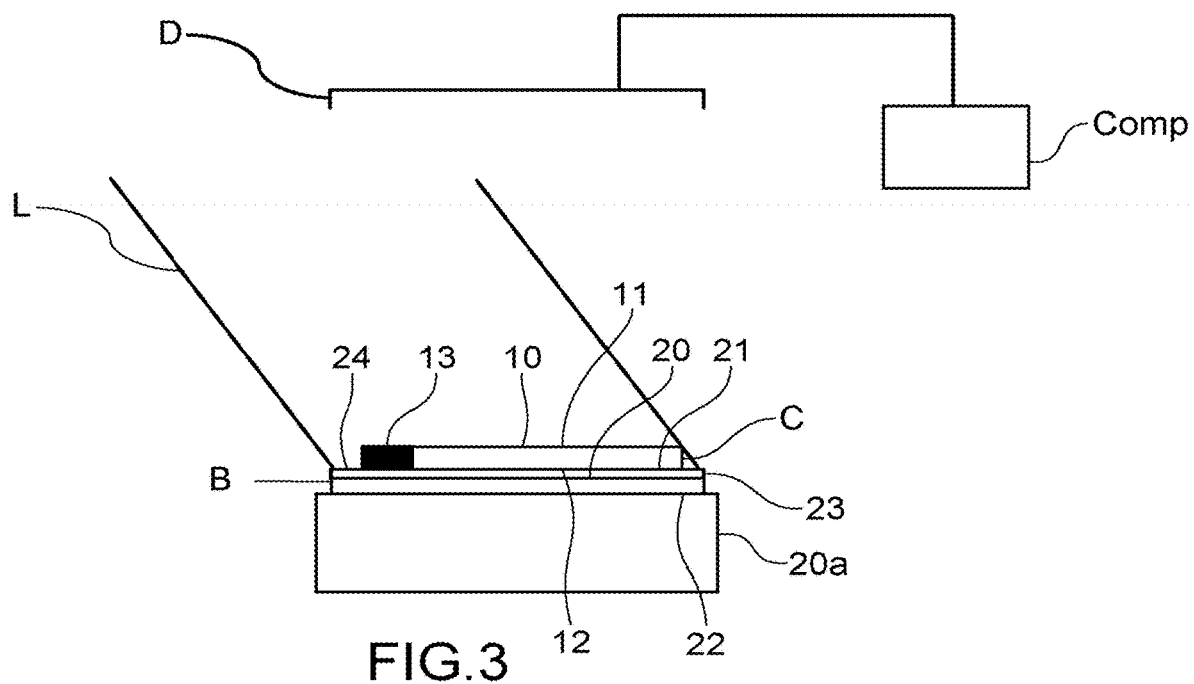
FIG. 3 represents an arrangement of a sample disposed on an active base plate for implementing the photoluminescence measurement of said sample according to a first embodiment of the present invention.

In FIG. 3, an example of arrangement of a sample 10 disposed on an active base plate 20 can be seen for implementing the photoluminescence measurement of said sample 10 according to a first embodiment of the present invention.

It is understood that the photoluminescence measurement involves detecting, by a detector D, a light signal emitted by the sample under the action of an excitation by a laser excitation source L. The detector D is connected to a calculator or computer Comp adapted to analyse data collected by said detector D and form and/or display luminescence mappings of the measured samples.

Thus, it is understood when a sample or another object emitting a photoluminescence signal is referred to, that said signal is the result of a laser excitation of said sample or object.

It is also clear throughout the following disclosure of the present invention that the photoluminescence measurement relates to the sample but also a base plate, called an active base plate, on which the sample bears. In particular, the active base plate measurement essentially relates to a peripheral section of said active base plate.

The sample 10 comprises two essentially parallel faces called a front face 11 and a rear face 12 respectively, and connected by a contour C.

Thus, the contour C delimits the sample 10 and thus makes up the edge of said sample 10.

The sample 10 can comprise any type of material likely to emit a photoluminescence signal under the effect of an excitation by an excitation laser.

In particular, the sample 10 can comprise a semiconductor material. For example, the semiconductor material can comprise silicon.

The sample 10 can be a photovoltaic cell.

The sample also comprises a first region 13, partly delimited by the contour C and emitting a photoluminescence signal with an intensity, called a first intensity, at any point lower than the mean intensity of the photoluminescence signal of the sample, called a reference intensity.

By "first region partly delimited by the contour C", it is meant a first region disposed in a peripheral zone of the sample 10.

The first region 13 can extend along the entire circumference of the sample 10.

For example, the first intensity can have an increasing profile along an axis extending from the contour C, the axis being advantageously perpendicular to the contour C.

The difference between the first intensity and the reference intensity can for example be due to a higher defect density at the first region in comparison with the mean defect density of the sample taken as a whole.

Defects are for example crystal defects, cracks at the contour, or even roughness or surface contaminations.

The presence of such defects promotes return to equilibrium of the electrons according to non-radiative recombinations at the expense of radiative recombinations.

The sample 10 bears on a base plate, called an active base plate 20. In particular, the sample 10 bears on an accommodating face 21 of the active base plate 20.

The active base plate 20 can bear on a passive base plate 20a. By passive base plate, it is meant a base plate which does not emit a photoluminescence signal under the action of a laser radiation. In this respect, the passive base plate 20a can comprise a metal and/or plastic material.

The active base plate 20 further comprises a second face 22 opposite and essentially parallel to the accommodating face 21, both faces 21 and 22 being connected to each other through an edge B.

The active base plate 20 is likely to emit a photoluminescence signal with an intensity, called a secondary intensity, at least equal to the reference intensity.

In this respect, the active base plate 20 can comprise a semiconductor material, in particular silicon.

The active base plate 20 can also comprise a first passivation layer 23 covering the accommodating face 21 intended to heal defects likely to be present on said accommodating face 21. The first passivation layer 23 then enables non-radiative recombinations to be drastically reduced at the accommodating face 21 and dark zones to be limited during the photoluminescence measurement due to defects present at the active base plate. In other words, the first passivation layer 23 enables the intensity of the signal emitted by the active base plate 20 to be increased and made even.

The first passivation layer 23 can comprise a dielectric material or hydrogenated amorphous silicon.

The dielectric material can comprise at least one of the materials chosen among: silicon dioxide, silicon nitride, alumina.

Besides, the active base plate 20 further comprises an edge B at a distance, along a projection distance, from the contour C, and delimiting with said contour C a peripheral section 24 of the active base plate 20. In other words, when the sample 10 bears on the active base plate 20, the latter projects from the sample 10 along the entire contour C of said sample 10.

Thus, the method according to the present invention comprises the photoluminescence measurement of the sample and, at least, of the peripheral section 24.

The measurement for the purpose of the present invention enables a mapping of the photoluminescence signal intensity of the sample 10 and of the peripheral section 24 to be performed.

During the measurement, the laser can sweep the front face 11 and the accommodating face 21 at the peripheral section 24.

Alternatively, the laser can have a size adapted to excite the sample 10 and the active base plate 20 simultaneously.

The signal thus collected by the detector D, for example a CCD sensor, enables the photoluminescence signal intensity mapping of the sample 10 and of the peripheral section 24 to be carried out.

The detection of the photoluminescence signal emitted by the peripheral section enables contrast between the active base plate 20 and the contour C of the sample 10 to be improved.

Figure 4:
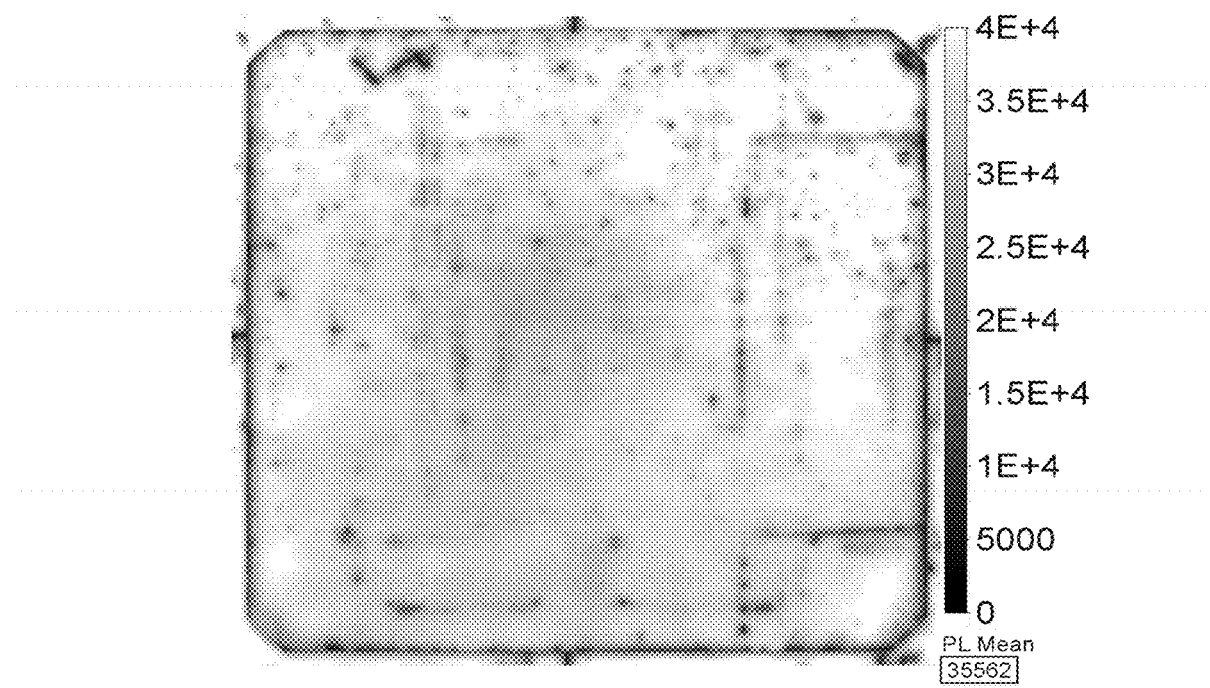
FIG. 4 represents a mapping of the photoluminescence signal intensity measured on a silicon sample bearing on an active base plate according to the present invention, the presence of the peripheral section, and in particular the detection of the photoluminescence signal relating to said section, reveals a dark, narrow band, and outlining a contour which is associated with the contour C of the silicon sample.

In this respect, FIG. 4 represents a mapping of the photoluminescence signal intensity measured on a silicon sample 10 bearing on an active base plate 20 according to the present invention. The presence of the peripheral section 24, and in particular the detection of the photoluminescence signal relating to said section, reveals a dark and narrow band, and drawing a contour which is associated with the contour C of the silicon sample.

Advantageously, the projection distance, at least at the at least one first region 23, is adjusted such that the variation in the photoluminescence signal intensity between the peripheral section 24 and the first region 13, reveals a singularity locating the contour of the sample at the first region. In other words, the projection distance is high enough to allow, from the photoluminescence measurement, accurate determination of the position of the contour C.

By "singularity", it is meant for example an intensity minimum.

Figure 5:
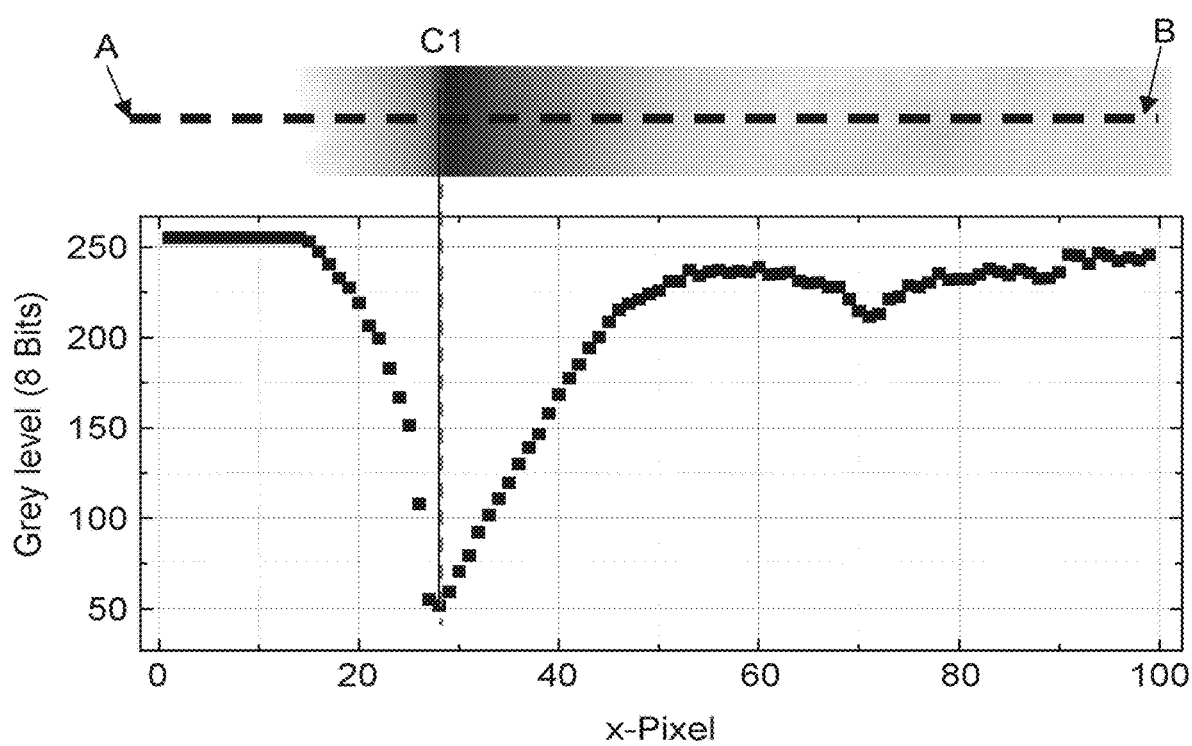
FIG. 5 is a graphic representation of a photoluminescence intensity profile (vertical axis, in arbitrary unit), along a position (horizontal axis, in arbitrary unit) on an axis extending from a point A of the peripheral section to a point B of the first region, the axis intersecting the contour C at a point C1, the axis being also in broken lines on a mapping section extracted from FIG. 4 and attached to said graphic representation.

In this respect, FIG. 5 represents the profile of the photoluminescence signal intensity on an axis extending from a point A of the peripheral section to a point B of the first region, the axis intersecting the contour C at a point C1.

The photoluminescence measurement method can also comprise a step of choosing the active base plate 20 among a plurality of active base plates as a function of the secondary intensity level of each base plate.

Indeed, in order to optimise photoluminescence contrast between the active base plate 20 and the contour C of the sample, it can be useful to choose an active base plate 20 which has a particular secondary intensity.

Figure 6A:
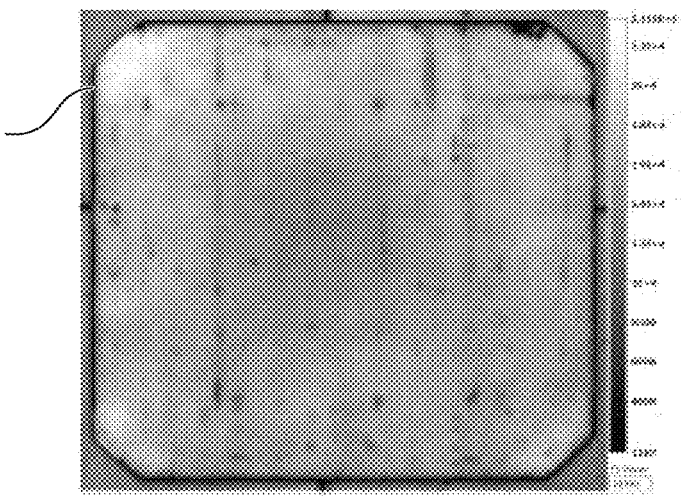
FIGS. 6a to 6c represent mappings of photoluminescence measured on a first, second and a third samples according to the present invention respectively, in particular, the reference intensity increases from the first sample to the third sample, and the active base plate, called first active base plate, implemented for these three measurements, has a secondary intensity generally lower than the reference intensity of the second and third samples.
Figure 6B:
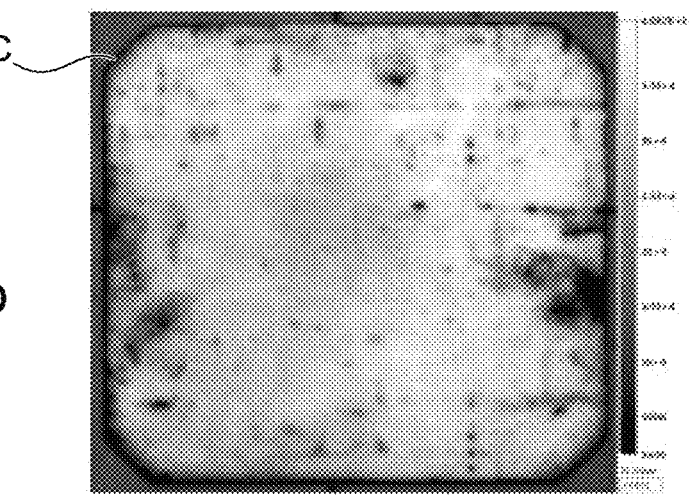
Figure 6C:
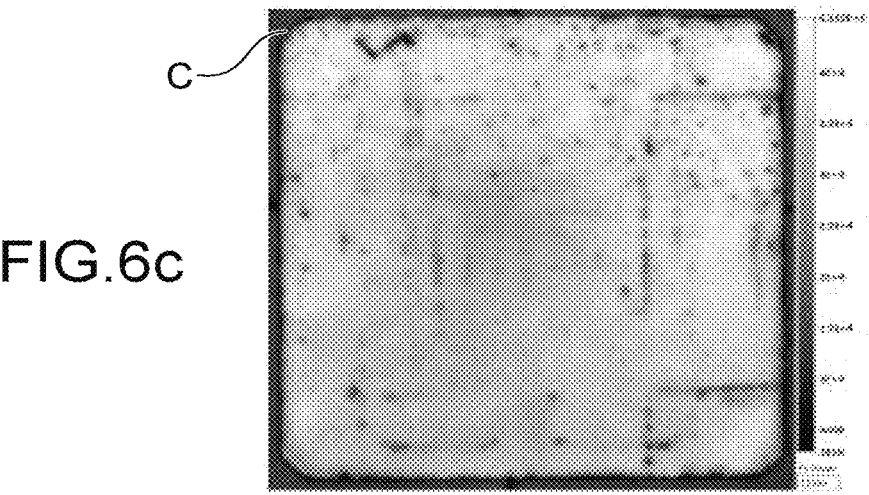

In this respect, FIGS. 6a to 6c represent photoluminescence mappings measured on a first, a second and a third sample respectively. In particular, the reference intensity increases from the first sample to the third sample. The active base plate 20, called the first active base plate, implemented for these three measurements, has a secondary intensity generally lower than the reference intensity of the second and third samples.

In FIG. 6a, a sharp delimitation of the contour C of the first sample is thus observed. In FIGS. 6b and 6c, the location of the contour C remains possible but seems to be less accurate.

Figure 7A:
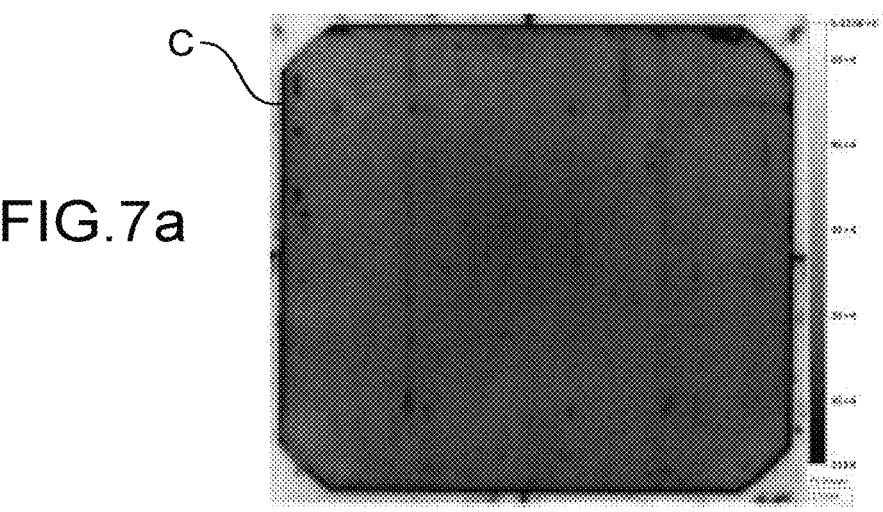
FIGS. 7a to 7c represent mappings of the first, second and third samples, taken in this order, and implementing an active base plate different from that of FIGS. 6a to 6c, called second active base plate, and which has a secondary intensity higher than the reference intensity of the third sample
Figure 7B:
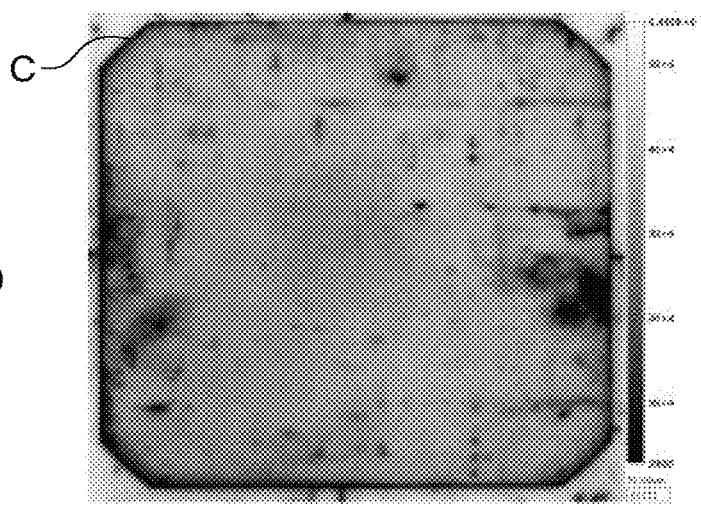
Figure 7C:
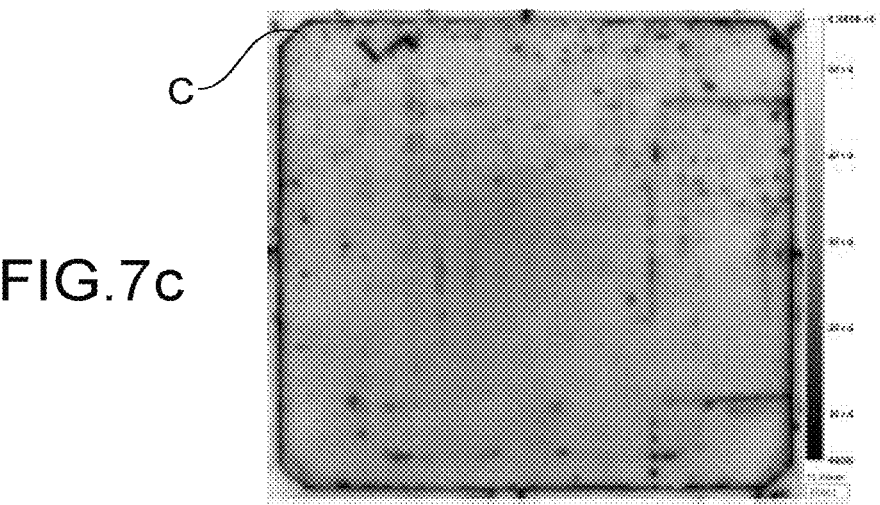

FIGS. 7a to 7c represent mappings of the first, second and third samples, taken in this order, and implement another active base plate 20, called a second active base plate. The second active base plate has a secondary intensity higher than the reference intensity of the third sample.

Whatever the sample measured, the contour C is perfectly defined on each of FIGS. 7a to 7c. However, the analysis of the photoluminescence signal of the first sample (FIG. 7a) remains difficult due to the detector D blinded by the photoluminescence signal emitted by the second base plate.

Figure 8:
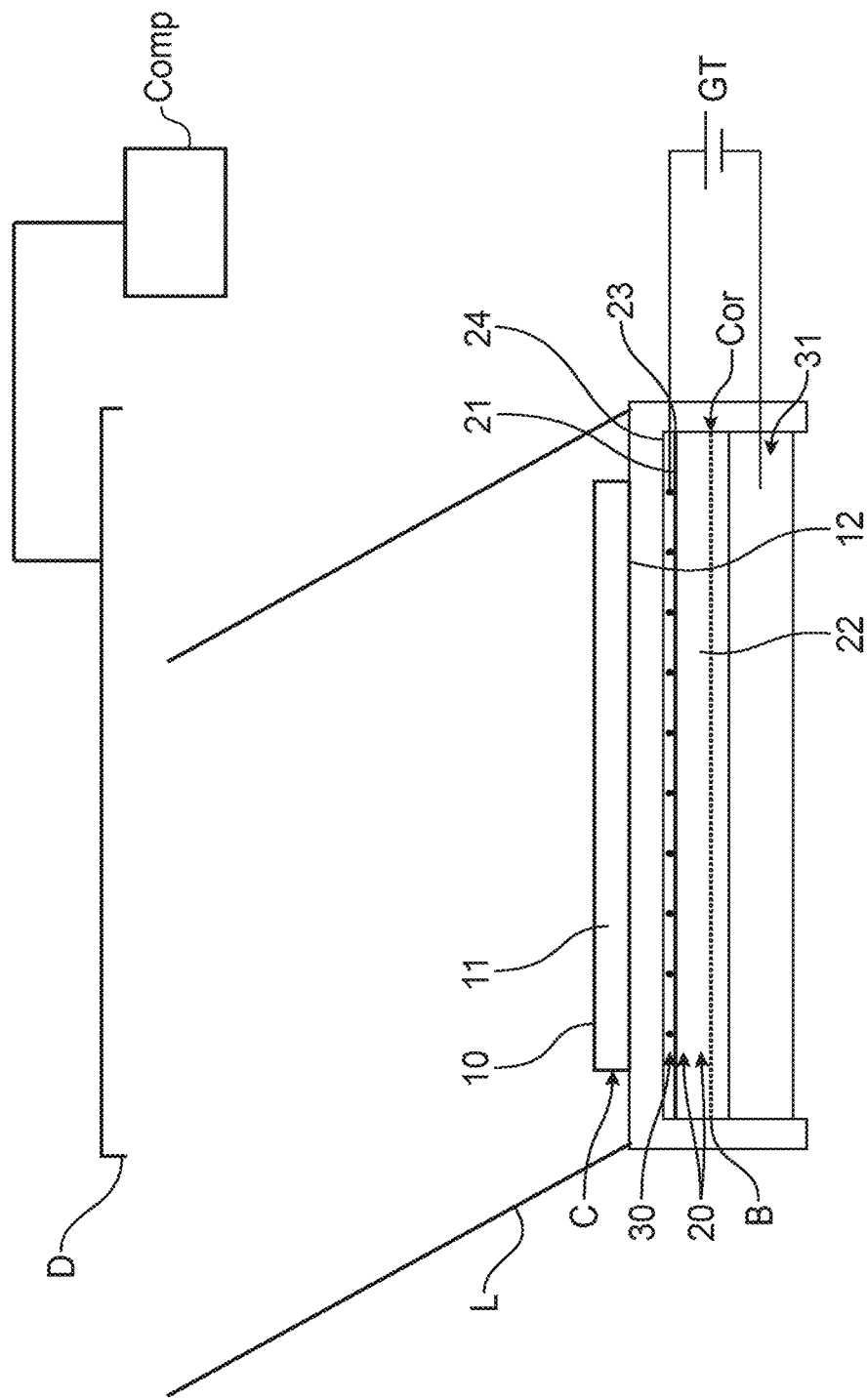
FIG. 8 represents an arrangement of a sample disposed on an active base plate for implementing the photoluminescence measurement of said sample according to a second embodiment of the present invention.

FIG. 8 illustrates a second embodiment of the present invention has essentially all the characteristics of the first embodiment.

According to this particularly advantageous second embodiment, a corona type charge Cor is created on the second face of the active base plate 20. The corona type charge enables the secondary intensity level, and consequently contrast between the first region 13 and the peripheral section 24 to be adjusted. In other words, no step of choosing a particular active base plate is required to optimise photoluminescence contrast between the active base plate 20 and contour C of the sample 10.

The corona type charge can be created by an anode 30 and a cathode 31 disposed facing the accommodating face 21 and the second face 22 respectively.

The anode can comprise a grid interposed between the sample 10 and the active base plate 22. The grid can for example comprise a metal.

It is also understood that the anode 30 and cathode 31 are supplied by a voltage generator GT.

Figure 9:
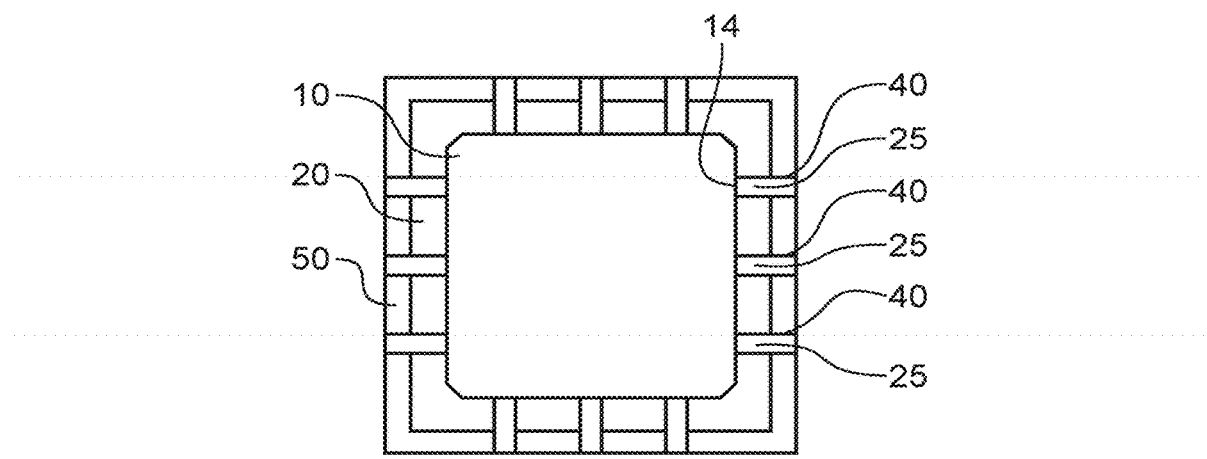
FIG. 9 is a schematic representation of an arrangement implementing an intermediate base plate interposed between the active base plate and the sample likely to be implemented for either of the first and second embodiments of the present invention.

According to either of the first and second embodiments, the sample can also comprise at least one second region 14, partly delimited by the contour C and which emits a photoluminescence signal with an intensity, called a second intensity, equal to the reference intensity on the average (FIG. 9).

The measurement method then implements masking means 40 for masking the photoluminescence signal emitted by a region 25 of the peripheral section adjoining the second region 14.

The masking means 40 comprise an intermediate base plate 50 interposed between the sample 10 and the active base plate 20. The intermediate base plate 50 can for example comprise a masking region 40 covering the region 25 of the peripheral section 24 adjoining the second region 14.

The intermediate base plate 50 comprises a material transparent to the photoluminescence signal emitted by the active base plate 20, and is covered with a opaque material to the same signal at the masking region(s) 40.

The material transparent can comprise a plastic, whereas the opaque material can comprise a layer of metal material.

The active base plate 20 can comprise a plurality of mini-active base plates 20a. In particular, each mini-base plate can be given a corona charge different from the other mini-base plates so as to optimise contrast level on different sections of the sample.

The invention also relates to a photoluminescence measurement device adapted for implementing the photoluminescence measurement method according to the present invention. The device has essentially the elements described in the present detailed description, and in particular elements relating to the second embodiment.

Figure 10:
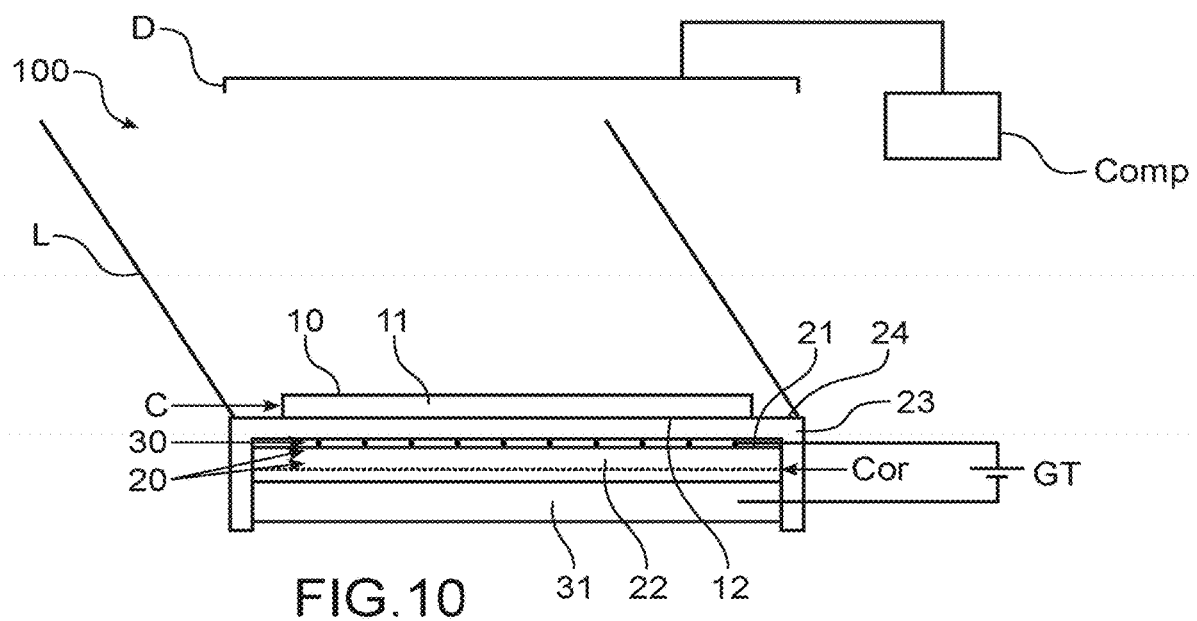
FIG. 10 is a schematic representation of a device likely to be implemented for carrying out the measurement according to the present invention.

In particular, the device 100, illustrated in FIG. 10, comprises:
 a base plate, called an active base plate 20, comprising an accommodating face 21 for a sample 10, and a second face 22 opposite to the accommodating face,
 a laser excitation source,
 a detector for collecting a photoluminescence signal emitted by a sample and the support under the action of the laser, The active base plate is likely to emit a photoluminescence signal under the effect of an excitation by the laser excitation source L, the device further comprising corona means for creating a corona type charge Cor on the second face 22.

The active base plate 20 can comprise a substrate made of a semiconductor material, advantageously the semiconductor material comprises silicon.

The active base plate 20 comprises a first passivation layer 23 covering its accommodating face 21, the first passivation layer 23 being for healing defects likely to be present on the accommodating face 21.

The corona means can comprise an anode 30 and a cathode 31, the anode comprising a grid disposed facing the accommodating face, and a cathode facing the second face.

REFERENCES

[1] P. Würfel, S. Finkbeiner, and E. Daub, "*Generalized Planck's radiation law for luminescence via indirect transitions*", Appl. Phys. A Mater. Sci. Process., vol. 60, no. 1, pp. 67-70, January 1995,

[2] T. Trupke, R. A. Bardos, M. C. Schubert, and W. Warta, "*Photoluminescence imaging of silicon wafers*", Appl. Phys. Lett., vol. 89, no. 4, p. 44107, July 2006.

The invention claimed is:

1. A method for photoluminescence measurement of a sample which comprises a front face and a rear face, connected by a contour, the sample bearing on an accommodating face of an active base plate at the rear face,
 the sample comprises at least one first region partly delimited by the contour and which emits a photoluminescence signal with a first intensity, at any point lower than a mean intensity of the photoluminescence signal of the sample called a reference intensity,
 the active base plate emitting a photoluminescence signal with a second intensity at least equal to the reference intensity, the active base plate further comprises an edge at a distance, according to a projection distance, from the contour, and delimiting a peripheral section of the active base plate with said contour.

2. The method according to claim 1, wherein the first region comprises a defect density higher than a mean defect density of the sample.

3. The method according to claim 1, wherein the at least one first region extends over the entire circumference of the sample.

4. The method according to claim 1, wherein the sample is a photovoltaic cell.

5. The method according to claim 1, wherein the photoluminescence signal emitted by the sample and by the active base plate is collected by a detector.

6. The method according to claim 1, wherein the projection distance, at least at the at least one first region, is adjusted such that a variation in the intensity of the photoluminescence signal between the peripheral section and the first region, reveals a singularity locating the contour of the sample at the first region.

7. The method according to claim 6, wherein the singularity is a minimum of the photoluminescence signal intensity.

8. The method according to claim 1, wherein the active base plate comprises a semiconductor material.

9. The method according to claim 8, wherein the semiconductor material comprises silicon.

10. The method according to claim 1, wherein the sample also comprises at least one second region, partly delimited by the contour and which emits a photoluminescence signal with a second intensity equal to the reference intensity on average, the measurement method implementing masking means intended to mask the photoluminescence signal emitted by a region of the peripheral section adjoining the second region.

11. The method according to claim 10, wherein the masking means comprises an intermediate base plate interposed between the sample and the active base plate, the intermediate base plate comprising a masking region covering a region of the peripheral section adjoining the second region.

12. The method according to claim 1, wherein a corona type charge is created on a second face of the active base plate opposite to the accommodating face, the corona type charge being intended to adjust the secondary intensity level.

13. The method according to claim 12, wherein the corona type charge is created by an anode and a cathode disposed facing the accommodating face and the second face respectively.

14. The method according to claim 13, wherein the anode comprises a grid interposed between the sample and the active base plate.

15. The method according to claim 1, wherein the active base plate comprises a first passivation layer covering the accommodating face, the first passivation layer being intended to heal defects likely to be present on the accommodating face.

16. The method according to claim 15, wherein the first passivation layer comprises a layer made of a dielectric material or of hydrogenated amorphous silicon.

17. The method according to claim 16, wherein the dielectric material comprises at least one of the following elements chosen among: silicon dioxide, silicon nitride, and alumina.

18. The method according to claim 1, wherein carrying out the process comprises exciting the sample and the peripheral section of the active base plate by a laser.

19. The method according to claim 18, wherein the laser sweeps the front face and the accommodating face at the peripheral section.

20. The method according to claim 18, wherein the laser has a size adapted to excite the sample and the active base plate simultaneously.

* * * * *